US012634839B2

(12) United States Patent
Chang et al.

(10) Patent No.:    US 12,634,839 B2
(45) Date of Patent:    *May 19, 2026

(54) METHOD FOR ADJUSTING TRANSMITTING POWER RATIO OF RADIO MODULE AND ASSOCIATED RADIO MODULE

(71) Applicant: MEDIATEK INC., Hsin-Chu (TW)

(72) Inventors: Han-Chun Chang, Hsinchu City (TW); Yen-Wen Yang, Hsinchu City (TW); Yi-Hsuan Lin, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 389 days.

This patent is subject to a terminal disclaimer.

(21) Appl. No.: 18/131,874

(22) Filed: Apr. 7, 2023

(65) Prior Publication Data

US 2023/0362836 A1    Nov. 9, 2023

Related U.S. Application Data

(60) Provisional application No. 63/337,639, filed on May 3, 2022.

(51) Int. Cl.
*H04W 52/36*    (2009.01)
(52) U.S. Cl.
CPC ................................ *H04W 52/367* (2013.01)

(58) Field of Classification Search
CPC . H04W 52/367; H04W 52/36; H04W 52/386; H04W 52/34; H04W 52/30
See application file for complete search history.

(56) References Cited

U.S. PATENT DOCUMENTS

| | | | |
|---|---|---|---|
| 11,289,806 B1 * | 3/2022 | Wyse | H01Q 3/26 |
| 2010/0291963 A1 | 11/2010 | Patel | |
| 2019/0349017 A1 * | 11/2019 | Kaidar | H04W 52/44 |
| 2020/0275387 A1 | 8/2020 | Park | |
| 2022/0255640 A1 * | 8/2022 | Guo | H04B 17/103 |

FOREIGN PATENT DOCUMENTS

| | | |
|---|---|---|
| CN | 102422686 A | 4/2012 |
| CN | 102714799 A | 10/2012 |
| CN | 105359420 A | 2/2016 |
| EP | 3 567 940 A1 | 11/2019 |
| EP | 3 799 316 A1 | 3/2021 |
| WO | 2012/122116 A1 | 9/2012 |

* cited by examiner

*Primary Examiner* — John J Lee
(74) *Attorney, Agent, or Firm* — Winston Hsu

(57) ABSTRACT

A method for adjusting a transmitting (TX) power ratio of a radio module includes: mapping a radiofrequency (RF) exposure limit to a TX power limit; interacting with at least one other radio module for adjusting the TX power ratio, to obtain an adjusted TX power ratio; and adjusting the TX power limit according to the adjusted TX power ratio, to generate an adjusted TX power limit of the radio module.

20 Claims, 3 Drawing Sheets

METHOD FOR ADJUSTING TRANSMITTING POWER RATIO OF RADIO MODULE AND ASSOCIATED RADIO MODULE

CROSS REFERENCE TO RELATED APPLICATIONS

This application claims the benefit of U.S. Provisional Application No. 63/337,639, filed on May 3, 2022. The content of the application is incorporated herein by reference.

BACKGROUND

The present invention is related to radio frequency (RF) technology, and more particularly, to a method for adjusting a transmitting (TX) power ratio of a radio module and an associated radio module.

Nowadays, the RF technology has often appeared in a user equipment (UE; such as a mobile phone). However, excessive RF exposure may cause harm to human body. As a result, officials of different countries (e.g. federal communications commission (FCC) of USA, innovation, science, and economic development (ISED) of Canada, and conformite europeenne (CE) of Europe) regulate a time-averaged RF exposure limit to limit a time-averaged RF exposure of a radio module in the UE. For example, in response to a frequency band of the radio module being smaller than 6 GHz, the time-averaged RF exposure will be quantified with a time-averaged specific absorption rate (SAR), and in response to the frequency band of the radio module being not smaller than 6 GHz, the time-averaged RF exposure will be quantified with a time-averaged power density (PD). In addition, since the time-averaged RF exposure will be proportional to a TX power of the radio module, the time-averaged RF exposure can meet the time-averaged RF exposure limit by controlling the TX power.

For simultaneous multi-radio access technology (multi-RAT) transmission (e.g. 2G, 3G, 4G, FR1, FR2, wireless fidelity (Wi-Fi), and Bluetooth (BT)), the officials regulate that a total exposure ratio (TER) must be less than or equal to 1 (i.e. TER≤1). How to properly allocate the TX power of multiple radio modules in the UE to meet regulations and performance requirements at the same time has become an important issue. For a conventional TX power allocation method, only the maximum available TX power ratio is allocated to the multiple radio modules with a predetermined fixed ratio. The disadvantage is that even if any of the multiple radio modules only needs a TX power ratio less than the predetermined fixed ratio (i.e. one radio module will have a TX power margin remained unused), the others of the multiple radio modules may not be able to utilize the TX power margin, which will reduce ratio efficiency and performance. As a result, a novel method for adjusting a TX power ratio of a radio module and an associated radio module are urgently needed.

SUMMARY

It is therefore one of the objectives of the present invention to provide a method for adjusting a TX power ratio of a radio module and an associated radio module, to address the above-mentioned issues.

According to an embodiment of the present invention, a method for adjusting a TX power ratio of a radio module is provided. The method comprises: mapping an RF exposure limit to a TX power limit; interacting with at least one other radio module for adjusting the TX power ratio, to obtain an adjusted TX power ratio; and adjusting the TX power limit according to the adjusted TX power ratio, to generate an adjusted TX power limit of the radio module.

According to an embodiment of the present invention, a radio module for adjusting a TX power ratio of the radio module is provided. The radio module is arranged to: map an RF exposure limit to a TX power limit; interact with at least one other radio module for adjusting the TX power ratio, to obtain an adjusted TX power ratio; and adjust the TX power limit according to the adjusted TX power ratio, to generate an adjusted TX power limit of the radio module.

One of the benefits of the present invention is that, by the method of the present invention and an associated radio module, in the beginning, under a condition that any of multiple radio modules only needs a TX power ratio less than a predetermined fixed ratio (i.e. one radio module will have a TX power margin remained unused), the others of the multiple radio modules may be able to utilize the TX power margin for dynamically adjusting the TX power ratios of the others of the multiple radio modules and the any of the multiple radio modules (e.g. increasing the TX power ratios of the others of the multiple radio modules and decreasing the TX power ratio of the any of the multiple radio modules). Afterwards, under a condition that the any of multiple radio modules still only needs a current TX power ratio less than a previous adjusted TX power ratio (i.e. the one radio module will still have the TX power margin remained unused), the others of the multiple radio modules may be able to utilize the TX power margin for further dynamic adjustment. In this way, ratio efficiency and performance can be improved.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ".

Figure 1:
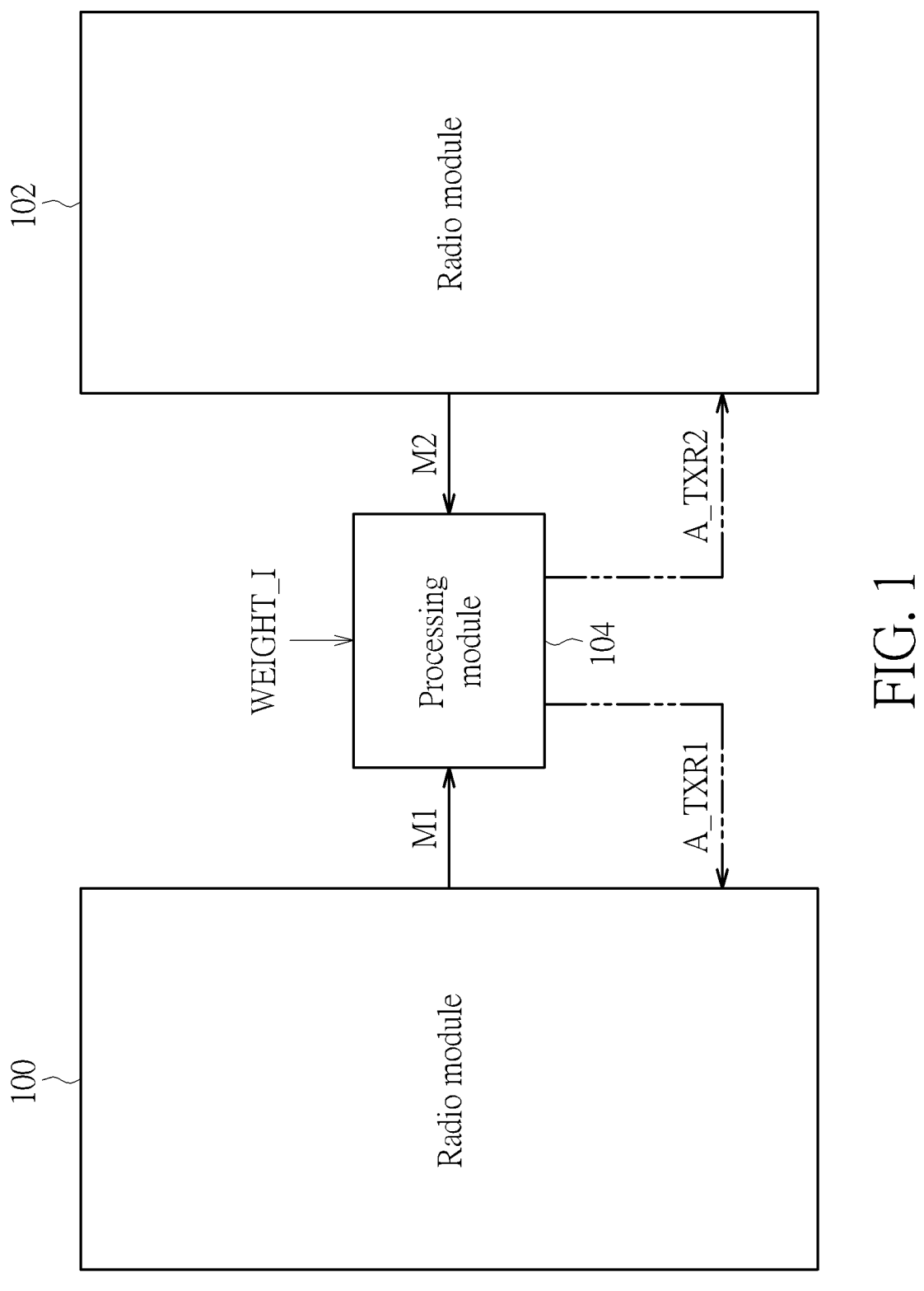
FIG. 1 is a diagram illustrating an adjustment scheme between two radio modules according to an embodiment of the present invention.

FIG. 1 is a diagram illustrating an adjustment scheme between two radio modules 100 and 102 according to an embodiment of the present invention. By way of example, but not limitation, the radio modules 100 and 102 may include communication circuits corresponding to sub-6, millimeter wave (mmWave), Wi-Fi, BT, Zigbee, global positioning system (GPS), vehicle to everything (V2X), and non-terrestrial networks (NTN). For example, the radio modules 100 and 102 may be a cellular module and a connectivity module, respectively, wherein the cellular module may correspond to sub-6 and mmWave, the connectivity module may correspond to Wi-Fi and BT, and the cellular module and the connectivity module may be disposed on different chips, respectively. However, this is for illustration only, and the present invention is not limited thereto.

As shown in FIG. 1, a processing module 104 may include circuits arranged to receive weighting information WEIGHT_I from a user or different scenarios for allocating a TX power ratio TXR1 of the radio module 100 and a TX power ratio TXR2 of the radio module 102. For example, the weighting information WEIGHT_I may be predetermined fixed ratios for the TX power ratios TXR1 and TXR2 from the user or the different scenarios. It should be noted that the processing module 104 may be implemented by one of the radio modules 100 and 102 (i.e. the processing module 104 can be a part of the radio module 100 or the radio module 102), and the processing module 104 may be further arranged to interact with the other of the radio modules 100 and 102 to receive at least one message from said the other of the radio modules 100 and 102, for dynamically adjusting the TX power ratios TXR1 and TXR2. In this embodiment, the dynamic adjustment of the TX power ratio is performed between two radio modules (e.g. the radio modules 100 and 102). However, this is for illustrative purposes only, and is not meant to be as a limitation of the present invention. In some embodiments, the dynamic adjustment of the TX power ratio can be performed between more than two radio modules. In practice, any radio module that is capable of interacting with at least one other radio module to receive at least one message, and dynamically adjusting the TX power ratio of any radio module at least according to the at least one message, can be employed by the processing module 104. These alternative designs all fall within the scope of the present invention.

In this embodiment, the radio module 100 may be arranged to receive a time-averaged RF exposure limit regulated by officials (for brevity, hereinafter denoted by "RF exposure limit"), wherein the RF exposure limit corresponds to the radio module 100. Since the RF exposure limit is proportional to a TX power of the radio module 100, the radio module 100 may be further arranged to map the RF exposure limit to a TX power limit TPL1 of the radio module 100. Specifically, the RF exposure limit may be a total exposure ratio (TER), wherein the TER may include a normalized average specific absorption rate (SAR) limit and a normalized average power density (PD) limit, and the TER is required to be less than or equal to 1 (i.e. TER≤1). The radio module 100 may utilize a test or a simulation to find a first normalized average TX power limit mapped to the normalized average SAR limit and a second normalized average TX power limit mapped to the normalized average PD limit, wherein the TX power limit TPL1 includes the first normalized average TX power limit and the second normalized average TX power limit. However, this is for illustration only, and the present invention is not limited thereto. In some embodiments, the user may directly utilize the test or the simulation to find the TX power limit TPL1. That is, the RF exposure limit may also be mapped to the TX power limit TPL1 of the radio module 100 directly by the user. Similarly, the radio module 102 may be arranged to receive an RF exposure limit regulated by officials, wherein the RF exposure limit corresponds to the radio module 102. Since the RF exposure limit is proportional to a TX power of the radio module 102, the radio module 102 may be further arranged to map the RF exposure limit to a TX power limit TPL2 of the radio module 102. However this is for illustration only, and the present invention is not limited thereto. In some embodiments, the user may directly utilize the test or the simulation to find the TX power limit TPL2. That is, the RF exposure limit may also be mapped to the TX power limit TPL2 of the radio module 102 directly by the user.

Under a condition that the processing module 104 is implemented by the radio module 100, the processing module 104 may interact with the radio module 102 to receive at least one message M2 from the radio module 102, and adjust the TX power ratios TXR1 and TXR2 at least according to the at least one message M2 to obtain adjusted TX power ratios A_TXR1 and A_TXR2, respectively. For example, the processing module 104 may adjust the TX power ratios TXR1 and TXR2 according to only the at least one message M2 to obtain the adjusted TX power ratios A_TXR1 and A_TXR2, respectively. For another example, the processing module 104 may adjust the TX power ratios TXR1 and TXR2 according to both at least one message M1 that is calculated by the radio module 100 and the at least one message M2 to obtain the adjusted TX power ratios A_TXR1 and A_TXR2, respectively. It should be noted that in some embodiments, under a condition that the processing module 104 is not able to receive the at least one message M2 from the radio module 102 due to some reasons, the processing module 104 may adjust the TX power ratios TXR1 and TXR2 according to only the at least one message M1 to obtain the adjusted TX power ratios A_TXR1 and A_TXR2, respectively. In some embodiments, after the processing module 104 receives the at least one message M2 from the radio module 102 by interacting with the radio module 102, the at least one message M2 may be stored in a memory (not shown in FIG. 1), and the processing module 104 may adjust the TX power ratios TXR1 and TXR2 according to only the at least one message M1 to obtain the adjusted TX power ratios A_TXR1 and A_TXR2, respectively. These alternative designs all fall within the scope of the present invention. The radio module 100 may be arranged to adjust the TX power limit TPL1 according to the adjusted TX power ratio A_TXR1, to generate an adjusted TX power limit ATPL1 of the radio module 100.

In addition, under a condition that the processing module 104 is implemented by the radio module 102, the processing module 104 may interact with the radio module 100 to receive at least one message M1 from the radio module 100, and adjust the TX power ratios TXR1 and TXR2 at least according to the at least one message M1 to obtain the adjusted TX power ratios A_TXR1 and A_TXR2, respectively. For example, the processing module 104 may adjust the TX power ratios TXR1 and TXR2 according to only the at least one message M1 to obtain the adjusted TX power ratios A_TXR1 and A_TXR2, respectively. For another example, the processing module 104 may adjust the TX power ratios TXR1 and TXR2 according to both the at least one message M1 and the at least one message M2 that is calculated by the radio module 102 to obtain the adjusted TX power ratios A_TXR1 and A_TXR2, respectively. It should be noted that in some embodiments, under a condition that the processing module 104 is not able to receive the at least one message M1 from the radio module 100 due to some reasons, the processing module 104 may adjust the TX power ratios TXR1 and TXR2 according to only the at least one message M2 to obtain the adjusted TX power ratios A_TXR1 and A_TXR2, respectively. In some embodiments, after the processing module 104 receives the at least one message M1 from the radio module 100 by interacting with the radio module 100, the at least one message M1 may be stored in a memory (not shown in FIG. 1), and the processing module 104 may adjust the TX power ratios TXR1 and TXR2 according to only the at least one message M2 to obtain the adjusted TX power ratios A_TXR1 and A_TXR2, respectively. These alternative designs all fall within the scope of the present invention. The radio module 102 may be arranged to adjust the TX power limit TPL2 according to the adjusted TX power ratio A_TXR2, to generate an adjusted TX power limit ATPL2 of the radio module 102.

The at least one message M1 and the at least one message M2 may include an on/off status of the radio module 100 and an on/off status of the radio module 102, respectively, wherein the off status represents that corresponding radio module has not performed an TX operation for a period of time (e.g. the corresponding radio module is in a shut down mode, a flight mode, a sleep mode, a discontinuous transmission (DTX) mode, a call drop mode, or a no subscriber identity module (SIM) card mode), and the on status represents that the corresponding radio module is not in the off status. For example, when the corresponding radio module is not in the shut down mode, the flight mode, the sleep mode, the DTX mode, the call drop mode, or the no SIM card mode, the corresponding radio module is in the on status. In addition, each of the at least one message M1 and the at least one message M2 may further include some information of the corresponding radio module. By way of example, but not limitation, the information of the corresponding radio module may include a previous TX power ratio, a TX power ratio margin, one or more TX performance indices, one or more receiving (RX) performance indices, one or more weighting information (e.g. the weighting information WEIGHT_I), or one or more configurations.

The one or more TX performance indices may include at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER). The one or more RX performance indices may include at least one of a duty cycle of RX, a modulation and coding scheme (MCS), a block error rate (BLER), a resource block (RB), a received signal strength indication (RSSI), a reference signal receiving power (RSRP), a signal to noise ratio (SNR), a signal-to-interference-plus-noise ratio (SINR), and an RX packet error rate (RX PER). The one or more configurations may be related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and an SIM.

In detail, under a condition that the processing module 104 is implemented by the radio module 100, in the beginning, the processing module 104 may interact with the radio module 102 to receive the on/off status of the radio module 102 included in the at least one message M2. In response to the on/off status indicating that the radio module 102 is off, the processing module 104 may allocate at least a portion (e.g. part or all) of the TX power ratio TXR2 of the radio module 102 to the TX power ratio TXR1 of the radio module 100 with a margin remained for the radio module 102, to obtain the adjusted TX power ratios A_TXR1 and A_TXR2, wherein the margin may be dynamically calculated according to the at least one message M1 and/or the at least one message M2. In response to the on/off status indicating that the radio module 102 is on, the processing module 104 may interact with the radio module 102 to receive the information of the radio module 102 included in the at least one message M2, and dynamically adjust the TX power ratio TXR1 of the radio module 100 and the TX power ratio TXR2 of the radio module 102 according to the information of the radio module 102 and the information of the radio module 100 included in the at least one message M1 that is calculated by the radio module 100, to obtain the adjusted TX power ratios A_TXR1 and A_TXR2, respectively. For example, under a condition that the weighting information WEIGHT_I indicates that the predetermined fixed ratio for the radio module 102 is 0.4 and the actual used TX power ratio of the radio module 102 is 0.2, the TX power ratio margin of the radio module 102 is 0.2, and the processing module 104 may allocate the TX power ratio margin of the radio module 102 to the radio module 100, for dynamically adjusting the TX power ratios TXR1 and TXR2 to obtain the adjusted TX power ratios A_TXR1 and A_TXR2, respectively (e.g. increasing the TX power ratio TXR1 and correspondingly decreasing the TX power ratio TXR2 to obtain the adjusted TX power ratios A_TXR1 and A_TXR2, respectively). Afterwards, the radio module 100 may adjust the TX power limit TPL1 according to the adjusted TX power ratio A_TXR1, to generate the adjusted TX power limit ATPL1 of the radio module 100.

Similarly, under a condition that the processing module 104 is implemented by the radio module 102, in the beginning, the processing module 104 may interact with the radio module 100 to receive the on/off status of the radio module 100 included in the at least one message M1. In response to the on/off status indicating that the radio module 100 is off, the processing module 104 may allocate at least a portion (e.g. part or all) of the TX power ratio TXR1 of the radio module 100 to the TX power ratio TXR2 of the radio module 102 with a margin remained for the radio module 100, to obtain the adjusted TX power ratios A_TXR1 and A_TXR2, wherein the margin may be dynamically calculated according to the at least one message M1 and/or the at least one message M2. In response to the on/off status indicating that the radio module 100 is on, the processing module 104 may interact with the radio module 100 to receive the information of the radio module 100 included in the at least one message M1, and dynamically adjust the TX power ratio TXR1 of the radio module 100 and the TX power ratio TXR2 of the radio module 102 according to the information of the radio module 100 and the information of the radio module 102 included in the at least one message M2 that is calculated by the radio module 102, to obtain the adjusted TX power ratios A_TXR1 and A_TXR2, respectively. Afterwards, the radio module 102 may adjust the TX power limit TPL2 according to the adjusted TX power ratio A_TXR2, to generate the adjusted TX power limit ATPL2 of the radio module 102.

Figure 2:
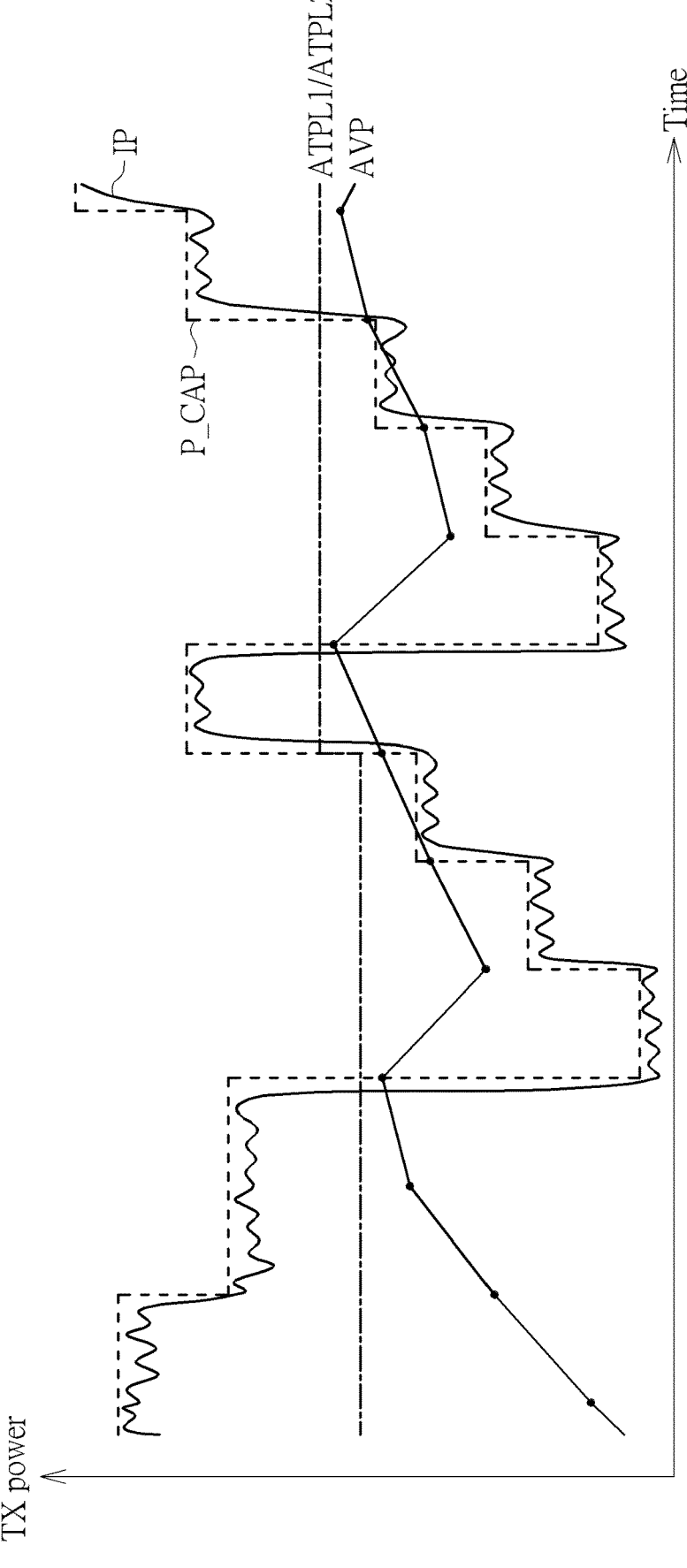
FIG. 2 is a diagram illustrating a control scheme of an instantaneous power of a radio module according to an embodiment of the present invention.

After generating the adjusted TX power limit ATPL1, the radio module 100 may control an instantaneous power IP of the radio module 100 to make an average power AVP of the radio module 100 lower than or equal to the adjusted TX power limit ATPL1. Similarly, after generating the adjusted TX power limit ATPL2, the radio module 102 may control the instantaneous power IP of the radio module 102 to make the average power AVP of the radio module 102 lower than or equal to the adjusted TX power limit ATPL2. Specifically, please refer to FIG. 2. FIG. 2 is a diagram illustrating a control scheme of the instantaneous power of the radio module 100/102 according to an embodiment of the present invention, wherein the horizontal axis of the diagram represents time, and the vertical axis of the diagram represents TX power of the radio module 100/102. As shown in FIG. 2, in order to comply with regulations of the RF exposure limit, the radio module 100/102 may be arranged to control the instantaneous power IP of the radio module 100/102 to be capped below a power cap P CAP, to make the average power AVP of the radio module 100/102 lower than or equal to the adjusted TX power limit ATPL1/ATPL2. Since operations of the power cap P CAP are well known to those with ordinary knowledge in the art, and the focus of the present invention is on dynamically adjusting the TX power ratio TXR1/TXR2 of the radio module 100/102, the details of the operations of the power cap P CAP will be omitted for brevity.

After the average power AVP of the radio module 100 is controlled to be lower than or equal to the adjusted TX power limit ATPL1 of the radio module 100, the radio module 100 may be further arranged to calculate the at least one message M1 of the radio module 100, for interacting with the radio module 102. For example, the radio module 100 may calculate the previous TX power ratio, the TX power ratio margin, the one or more TX performance indices, the one or more RX performance indices, the one or more weighting information, or the one or more configurations. Similarly, After the average power AVP of the radio module 102 is controlled to be lower than or equal to the adjusted TX power limit ATPL2 of the radio module 102, the radio module 102 may be further arranged to calculate the at least one message M2 of the radio module 102, for interacting with the radio module 100. For brevity, similar descriptions for this embodiment are omitted.

Figure 3:
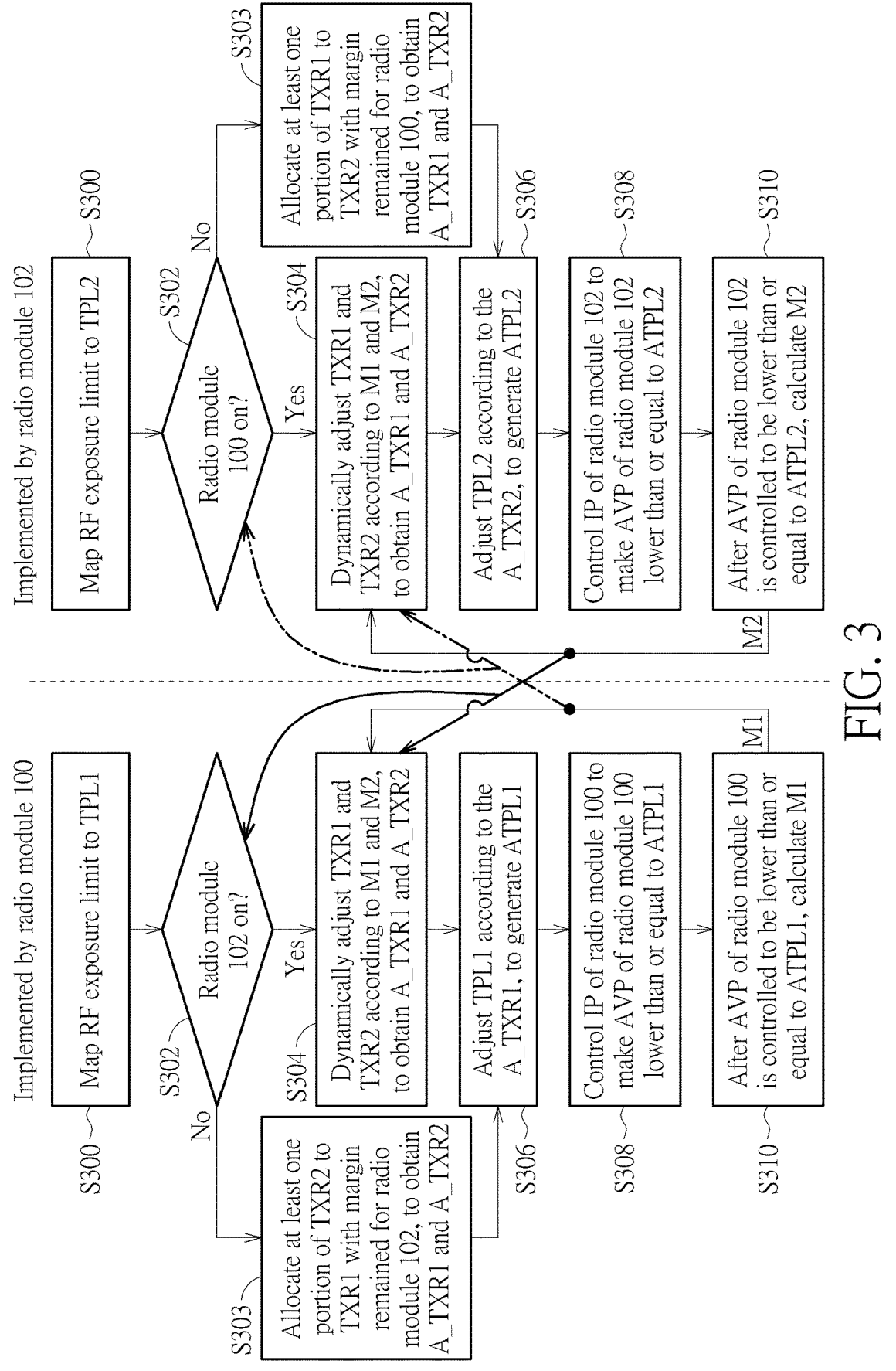
FIG. 3 is a flow chart of a method for adjusting a TX power ratio of a radio module according to an embodiment of the present invention.

FIG. 3 is a flow chart of a method for adjusting a TX power ratio of a radio module according to an embodiment of the present invention. Provided that the result is substantially the same, the steps are not required to be executed in the exact order shown in FIG. 3. For example, the method shown in FIG. 3 may be employed by the radio module 100, the radio module 102, and the processing module 104 shown in FIG. 1.

In Step S300, the radio module 100 maps the RF exposure limit corresponding to the radio module 100 to the TX power limit TPL1. Similarly, the radio module 102 maps the RF exposure limit corresponding to the radio module 102 to the TX power limit TPL2.

In Step S302, when the processing module 104 is implemented by the radio module 100, the on/off status of the radio module 102 included in the at least one message M2 is received by interacting with the radio module 102. Afterwards, it is determined that whether the on/off status indicates that the radio module 102 is on. If yes, Step S304 is entered; if no, Step S303 is entered. In addition, when the processing module 104 is implemented by the radio module 102, the on/off status of the radio module 100 included in the at least one message M1 is received by interacting with the radio module 100. Afterwards, it is determined that whether the on/off status indicates that the radio module 100 is on. If yes, Step S304 is entered; if no, Step S303 is entered.

In Step S303, when the processing module 104 is implemented by the radio module 100, in response to the on/off status indicating that the radio module 102 is off, at least a portion (e.g. part or all) of the TX power ratio TXR2 of the radio module 102 may be allocated to the TX power ratio TXR1 of the radio module 100 with a margin remained for the radio module 102, to obtain the adjusted TX power ratios A_TXR1 and A_TXR2. In addition, when the processing module 104 is implemented by the radio module 102, in response to the on/off status indicating that the radio module 100 is off, at least a portion (e.g. part or all) of the TX power ratio TXR1 of the radio module 100 may be allocated to the TX power ratio TXR2 of the radio module 102 with a margin remained for the radio module 100, to obtain the adjusted TX power ratios A_TXR1 and A_TXR2.

In Step S304, when the processing module 104 is implemented by the radio module 100, in response to the on/off status indicating that the radio module 102 is on, the information of the radio module 102 included in the at least one message M2 is received by interacting with the radio module 102, and the TX power ratio TXR1 of the radio module 100 and the TX power ratio TXR2 of the radio module 102 are dynamically adjusted according to the information of the radio module 102 and the information of the radio module 100 included in the at least one message M1, to obtain the adjusted TX power ratios A_TXR1 and A_TXR2, respectively. In addition, when the processing module 104 is implemented by the radio module 102, in response to the on/off status indicating that the radio module 100 is on, the information of the radio module 100 included in the at least one message M1 is received by interacting with the radio module 100, and the TX power ratio TXR1 of the radio module 100 and the TX power ratio TXR2 of the radio module 102 are dynamically adjusted according to the information of the radio module 100 and the information of the radio module 102 included in the at least one message M2, to obtain the adjusted TX power ratios A_TXR1 and A_TXR2.

In Step S306, the radio module 100 adjusts the TX power limit TPL1 according to the adjusted TX power ratio A_TXR1, to generate the adjusted TX power limit ATPL1. Similarly, the radio module 102 adjusts the TX power limit TPL2 according to the adjusted TX power ratio A_TXR2, to generate the adjusted TX power limit ATPL2.

In Step S308, the radio module 100 controls the instantaneous power IP of the radio module 100 to make the average power AVP of the radio module 100 lower than or equal to the adjusted TX power limit ATPL1. Similarly, the radio module 102 controls the instantaneous power IP of the radio module 102 to make the average power AVP of the radio module 102 lower than or equal to the adjusted TX power limit ATPL2.

In Step S310, after the average power AVP of the radio module 100 is controlled to be lower than or equal to the adjusted TX power limit ATPL1 of the radio module 100, the radio module 100 calculates the at least one message M1 of the radio module 100 for interacting with the radio module 102. Similarly, after the average power AVP of the radio module 102 is controlled to be lower than or equal to the adjusted TX power limit ATPL2 of the radio module 102, the radio module 102 calculates the at least one message M2 of the radio module 102 for interacting with the radio module 100.

Since a person skilled in the pertinent art can readily understand details of the steps after reading above paragraphs directed to the radio module 100, the radio module 102, and the processing module 104 shown in FIG. 1, further descriptions are omitted here for brevity.

In summary, by the method of the present invention and an associated radio module, in the beginning, under a condition that any of multiple radio modules only needs a TX power ratio less than a predetermined fixed ratio (i.e. one radio module will have a TX power margin remained unused), the others of the multiple radio modules may be able to utilize the TX power margin for dynamically adjusting the TX power ratios of the others of the multiple radio modules and the TX power ratio of the any of the multiple radio modules (e.g. increasing the TX power ratios of the others of the multiple radio modules and correspondingly decreasing the TX power ratio of the any of the multiple radio modules). Afterwards, under a condition that the any of multiple radio modules still only needs a current TX power ratio less than a previous adjusted TX power ratio (i.e. the one radio module will still have the TX power margin remained unused), the others of the multiple radio modules may be able to utilize the TX power margin for further dynamic adjustment. In this way, ratio efficiency and performance can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting a transmitting (TX) power ratio of a radio module, comprising:

mapping a radiofrequency (RF) exposure limit to a TX power limit;

interacting with at least one other radio module for adjusting the TX power ratio, to obtain an adjusted TX power ratio; and adjusting the TX power limit according to the adjusted TX power ratio, to generate an adjusted TX power limit of the radio module;

wherein the step of interacting with the at least one other radio module for adjusting the TX power ratio, to obtain the adjusted TX power ratio comprises:

receiving at least one message of the at least one other radio module; and adjusting the TX power ratio at least according to the at least one message of the at least one other radio module, to obtain the adjusted TX power ratio.

2. The method of claim 1, wherein the at least one message of the at least one other radio module comprises an on/off status of the at least one other radio module.

3. The method of claim 2, wherein the step of adjusting the TX power ratio at least according to the at least one message of the at least one other radio module, to obtain the adjusted TX power ratio comprises:

in response to the on/off status indicating that the at least one other radio module is off, allocating a TX power ratio of the at least one other radio module to the radio module with a margin remained for the at least one other radio module.

4. The method of claim 2, wherein the step of adjusting the TX power ratio at least according to the at least one message of the at least one other radio module, to obtain the adjusted TX power ratio comprises:

in response to the on/off status indicating that the at least one other radio module is on, dynamically adjusting the TX power ratio according to the at least one message of the at least one other radio module and at least one message of the radio module.

5. The method of claim 4, wherein each of the at least one message of the at least one other radio module and the at least one message of the radio module comprises a previous TX power ratio, a TX power ratio margin, one or more TX performance indices, one or more receiving (RX) performance indices, multiple weighting information, or one or more configurations.

6. The method of claim 5, wherein each of the at least one message of the at least one other radio module and the at least one message of the radio module comprises the one or more TX performance indices, including at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER).

7. The method of claim 5, wherein each of the at least one message of the at least one other radio module and the at least one message of the radio module comprises the one or more RX performance indices, including at least one of a duty cycle of RX, a modulation and coding scheme (MCS), a block error rate (BLER), a resource block (RB), a received signal strength indication (RSSI), a reference signal receiving power (RSRP), a signal to noise ratio (SNR), a signal-to-interference-plus-noise ratio (SINR), and an RX packet error rate (RX PER).

8. The method of claim 5, wherein each of the at least one message of the at least one other radio module and the at least one message of the radio module comprises the one or more configurations related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and a subscriber identity module (SIM).

9. The method of claim 1, further comprising:

controlling an instantaneous power to make an average power lower than or equal to the adjusted TX power limit.

10. The method of claim 1, further comprising:

calculating at least one message of the radio module, for interacting with the at least one other radio module, wherein the at least one message of the radio module comprises at least one of a previous TX power ratio, a TX power ratio margin, one or more TX performance indices, one or more receiving (RX) performance indices, multiple weighting information, or one or more configurations.

11. A radio module for adjusting a transmitting (TX) power ratio of the radio module, wherein the radio module is arranged to:

map a radiofrequency (RF) exposure limit to a TX power limit;

interact with at least one other radio module for adjusting the TX power ratio, to obtain an adjusted TX power ratio; and adjust the TX power limit according to the adjusted TX power ratio, to generate an adjusted TX power limit of the radio module;

wherein the radio module is further arranged to receive at least one message of the at least one other radio module, and adjust the TX power ratio at least according to the at least one message of the at least one other radio module, to obtain the adjusted TX power ratio.

12. The radio module of claim 11, wherein the at least one message of the at least one other radio module comprises an on/off status of the at least one other radio module.

13. The radio module of claim 12, wherein in response to the on/off status indicating that the at least one other radio module is off, the radio module allocates a TX power ratio of the at least one other radio module to the radio module with a margin remained for the at least one other radio module.

14. The radio module of claim 12, wherein in response to the on/off status indicating that the at least one other radio module is on, the radio module dynamically adjusts the TX power ratio according to the at least one message of the at least one other radio module and at least one message of the radio module.

15. The radio module of claim 14, wherein each of the at least one message of the at least one other radio module and the at least one message of the radio module comprises a previous TX power ratio, a TX power ratio margin, one or more TX performance indices, one or more receiving (RX) performance indices, one or more weighting information, or one or more configurations.

16. The radio module of claim 15, wherein each of the at least one message of the at least one other radio module and the at least one message of the radio module comprises the one or more TX performance indices, including at least one of a duty cycle of TX, an error vector magnitude (EVM) of TX, a target power, a throughput, a modulation and coding scheme (MCS), a block error rate (BLER), a resource block (RB), a transmission block size (TBS), and a TX packet error rate (TX PER).

17. The radio module of claim 15, wherein each of the at least one message of the at least one other radio module and the at least one message of the radio module comprises the one or more RX performance indices, including at least one of a duty cycle of RX, a modulation and coding scheme (MCS), a block error rate (BLER), a resource block (RB), a received signal strength indication (RSSI), a reference signal receiving power (RSRP), a signal to noise ratio (SNR), a signal-to-interference-plus-noise ratio (SINR), and an RX packet error rate (RX PER).

18. The radio module of claim 15, wherein each of the at least one message of the at least one other radio module and the at least one message of the radio module comprises the one or more configurations related to at least one of an antenna, a band, a beam, a technology, a sub-band, one or more exposure condition indices, a simultaneous transmitted state, a mobile country code (MCC), a mobile network code (MNC), a modulation, a bandwidth, a maximum power reduction (MPR), a path, a duty cycle, and a combination of the band and a subscriber identity module (SIM).

19. The radio module of claim 11, wherein the radio module is further arranged to control an instantaneous power to make an average power lower than or equal to the adjusted TX power limit.

20. The radio module of claim 11, wherein the radio module is further arranged to calculate at least one message of the radio module, for interacting with the at least one other radio module, wherein the at least one message of the radio module comprises at least one of a previous TX power ratio, a TX power ratio margin, one or more TX performance indices, one or more receiving (RX) performance indices, multiple weighting information, or one or more configurations.

* * * * *